Sept. 27, 1932.  G. E. MIRFIELD  1,879,398
GAUGE FOR SIZING INTERNAL THREADS
Filed June 22, 1929
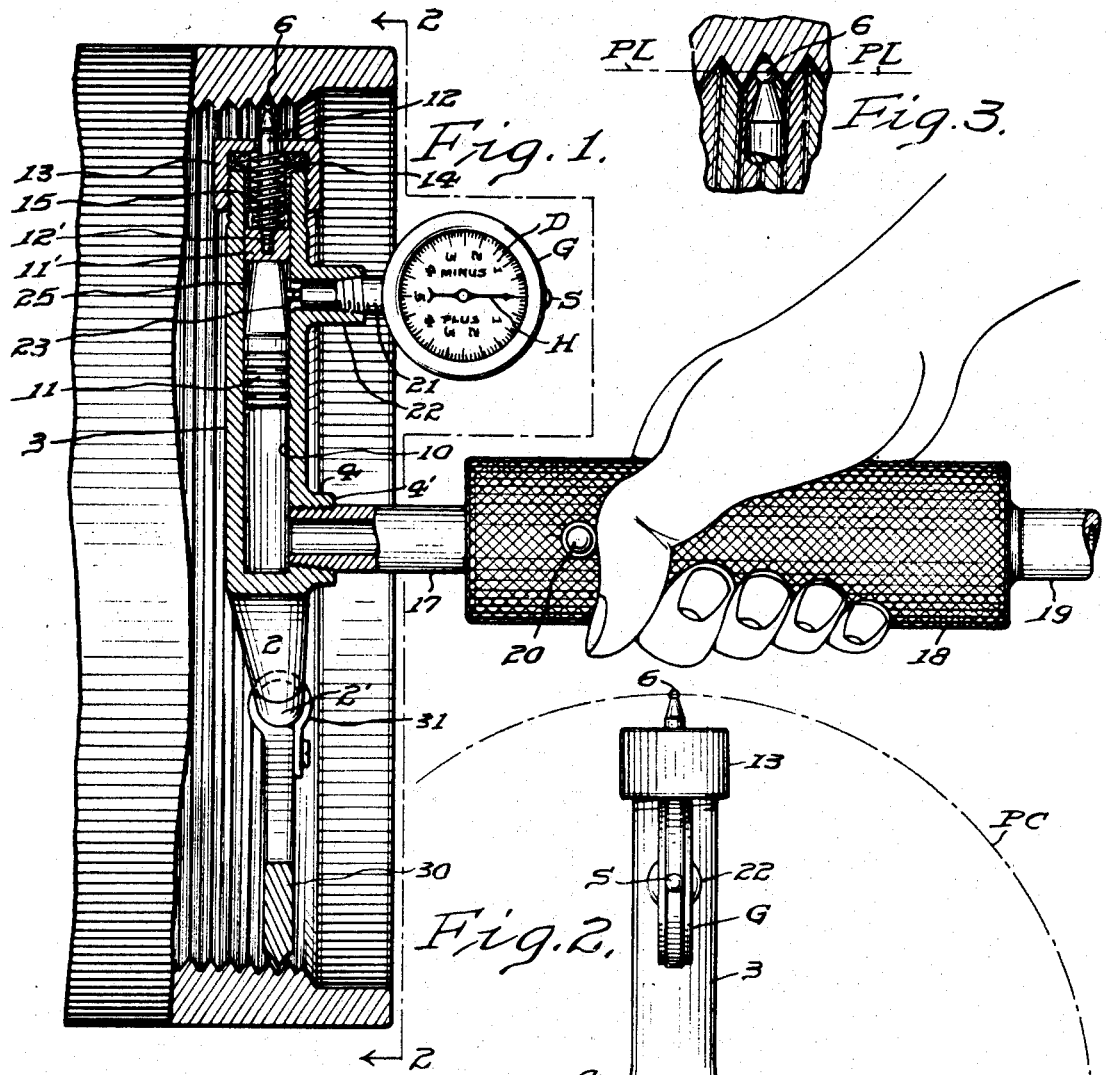
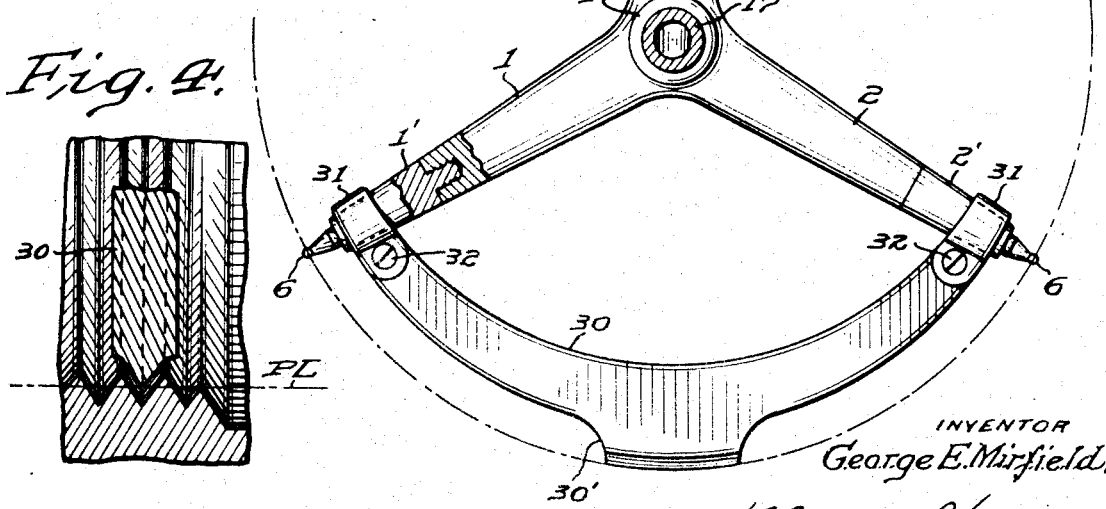

Patented Sept. 27, 1932

1,879,398

UNITED STATES PATENT OFFICE

GEORGE E. MIRFIELD, OF YOUNGSTOWN, OHIO

GAUGE FOR SIZING INTERNAL THREADS

Application filed June 22, 1929. Serial No. 372,904.

While gauges constructed in accordance with the present invention are suitable for sizing internal threads in various objects, they are particularly adapted and designed for sizing such threads in pipe couplings of relatively large diameter such, for example, as those used for oil well casing pipe. Commercial requirements dictate extreme accuracy in the threads in such couplings and they are therefore formed to very close plus or minus tolerances, each coupling being sized by an inspector after being threaded to determine whether it is within the limits permitted.

It has heretofore been the custom to size each coupling by screwing first one end and then the other thereof upon an externally threaded test plug made of hardened steel, the extent to which the coupling can be screwed upon this plug determining whether the coupling threads exceed the plus or minus tolerances permitted. Thus, if the coupling can be screwed to a predetermined point on the plug, it is considered that its threads are of exactly the proper diameter, while the distance it can be screwed past that point or by which it falls short of reaching the same determines whether the tolerances have been exceeded.

This method of sizing couplings is open to numerous objections, among which may be mentioned the relatively considerable time required for screwing first one end of each coupling on the test plug and then unscrewing it therefrom and repeating these operations with the other end, as well as the physical labor required of the workman both in screwing and unscrewing the heavy couplings from the plug and in lifting them from and returning them to the floor. Moreover, the method is unsatisfactory in that no two workmen will exert exactly the same amount of force in screwing a given coupling onto the plug, an operation which is usually performed by means of a large wrench, in consequence of which a series of couplings sized by one workman will average either larger or smaller than another series sized by a different workman though using the same wrench and test plug. Additionally, as the tour of duty of each workman proceeds, the labor of lifting the couplings and screwing them on and unscrewing them from the plug results in increasing fatigue, so that he gradually becomes physically unable to screw a given coupling as far on the test plug as he initially could; consequently, as he becomes more and more fatigued, the workman, through no fault of his own, begins to reject as too small couplings which he previously would have considered as well within the tolerances permitted when able to exert his maximum strength in screwing them on the plug.

For these reasons, among others, the said method of sizing internally threaded couplings and the like is by no means satisfactory, although so far as I am aware it has hitherto generally been used by coupling manufacturers and has been considered by them as the best practical method of sizing so far devised.

A principal object of my invention, therefore, is to provide a device in the nature of a gauge by means of which internally threaded couplings and other articles may be readily, rapidly and accurately sized without screwing them on a test plug and of such character as to substantially eliminate the human equation necessarily incident to that method of sizing.

A further object of the invention is to provide a gauge for sizing couplings and other internally threaded articles by means of which the sizing operation can be performed more rapidly and more accurately than by the usual sizing method and without the necessity of lifting the couplings from the floor for the testing operation and returning them thereto thereafter and which avoids the fatigue resulting from the handling of the couplings and the screwing them on and off the test plugs necessarily inherent in the said method.

A still further object of the invention is to provide a gauge of the character aforesaid which may be readily adjusted for sizing couplings of different diameters and having different sizes or forms of threads; which is independent, so far as its accuracy is concerned, of variations in the pressure of the compressed air or other actuating medium employed, and which is relatively inexpensive, of rugged construction and not liable to get out of order or become damaged under the conditions of use to which it is necessarily subjected.

Other objects, advantages and novel features of construction and arrangement comprehended by my invention are hereinafter more particularly pointed out or will be apparent to those skilled in the art from the following description of a gauge constructed in accordance therewith and illustrated in the accompanying drawing, in which Fig. 1 is a view, partially in central section and partially in side elevation, showing the gauge in use in the operation of sizing one end of an internally threaded coupling; Fig. 2 is a section on the line 2—2 in Fig. 1 but with the coupling removed, and Figs. 3 and 4 are respectively enlarged fragmentary sectional views showing the relation of the thread and certain portions of the gauge when in operation as hereinafter more fully described. Like symbols of reference are used to designate the same parts in the several figures.

As best shown in Fig. 2, the gauge comprises a plurality of legs, preferably three in number and respectively designated as 1, 2 and 3, which radiate symmetrically from a central hub or boss 4, the legs 1 and 2 being preferably solid and the leg 3 hollow for a purpose hereinafter described. While the legs 1 and 2 may be continuous throughout their extent they are preferably provided with removable end sections 1', 2' operatively secured to the major portions of the legs in any convenient way, desirably by providing each end section with an exteriorly threaded stem at its rear end of less diameter than its body and adapted for reception in an interiorly threaded bore in the end of the adjacent leg. Thus, when the end sections are screwed tightly into position in the legs they are operatively rigid therewith but may be readily removed and replaced with other sections of greater or less length to thereby adapt the gauge for use with couplings of different sizes.

The end of each end section is reduced in diameter and provided at its extremity with a ball point 6 desirably of hardened steel. These ball points are of the standard test diameter for the thread which is to be sized and are designed to enter the groove in a perfect thread for a predetermined distance with relation to its pitch line PL in the manner best indicated in Fig. 3. As the use of such standard test balls in the measurement of threads is well understood, further reference thereto would be superfluous.

As previously stated, the leg 3 is hollow to thereby form a cylinder 10 in which is disposed a piston 11 provided at its outer end with a head 11' having in its outer face an internally threaded bore for the reception of the correspondingly externally threaded stem 12' at the rear or inner end of a pin 12, the stem being desirably of smaller diameter than the pin so as to form a shoulder thereon which determines the adjusted position of the pin with respect to the piston when the parts are assembled. The outer end of the pin is reduced in diameter and provided at its extremity with a ball point 6 similarly to the other legs.

The outer end of the leg 3 is externally threaded for reception of a removable cap 13 which is centrally bored for the passage of the pin. Between the cap and the end of the leg a packing washer 14 of fibre or other suitable material may be disposed and, if desired, provided with a sleeve-like extension running down into the bore in the leg for a short distance so as to properly center the packing washer in the cap and also form a guide for a coil spring 15 which is loosely disposed about the pin between the head of the piston and the inner face of the cap; this spring constantly tends to urge the piston inwardly so as to retract the pin toward the cap.

For moving the piston outwardly in opposition to the spring, air or other suitable fluid under pressure is supplied when required to the inner end of the cylinder 10 through a nipple 17 threaded into a bored and threaded flange 4' integral with the boss 4. This nipple connects through a handle 18, conveniently of cylindrical form and of suitable diameter to be readily grasped by the operator as shown in Fig. 1 with a hose or flexible pipe 19 extending to a tank or other source of fluid supply. For controlling the flow or fluid to the cylinder, a valve, generally designated as 20, is provided in the handle; this valve may be of any suitable construction and is desirably so arranged that it may be opened by pressure of the operator's thumb to allow the fluid to pass to the cylinder or closed by merely releasing the said pressure.

For affording a visible indication of the size of the coupling thread an indicating gauge G of standard construction is provided and secured to the leg 3 by threading the gauge stem 21 in a boss 22 formed at a suitable point on the leg and preferably extending at right angles to its axis and on the same side thereof as that on which the handle is disposed. This indicating gauge is provided in the customary way with an indicating hand H and a dial D reading plus or minus from a zero point. Actuation of the hand is effected through movement of a plunger 23 which is slidable in the stem 21 of the gauge in the usual way, the arrangement being such that as the plunger is pushed into the stem the hand of the gauge is moved in a predetermined direction.

The outer end of the gauge plunger is cooperative with a conical surface 25 provided on the piston 11 between its head 11' and its main body portion and gradually tapering toward the former whereby as the piston is moved outwardly in the cylinder the gauge plunger is correspondingly moved into the gauge stem so as to actuate the hand of the gauge. A spring (not shown) is usually provided in gauges of the character of that which I prefer to use for the purpose of constantly urging the plunger outwardly of the stem and is thus operative to maintain the plunger at all times in engagement with the conical portion of the piston although such constant engagement is not necessarily required for the satisfactory operation of the device.

It will be understood that my improved sizing gauge is intended primarily for sizing only the first full thread in the coupling since if this thread is found to be of proper diameter it may be safely assumed that the other threads of the coupling are equally so, this being due to the method of manufacture employed in their production. To obtain a correct determination of the diameter of the first or any other given thread, however, it is requisite that the several balls 6 be all disposed in the groove of that thread, and to insure the observance of this condition by preventing a careless workman from locating two of the measuring balls in one thread convolution and the third ball in the adjacent convolution, I prefer to provide a safety guide, as it may conveniently be termed, which comprises an arcuate support 30 removably secured at its ends to two of the legs, preferably the legs 1 and 2, or to the removable end sections 1', 2' thereof as shown, in any suitable way, as by forming the ends of the support so as to partially surround the adjacent legs and providing complementary clips 31 to also engage thereover when screwed to the body of the support by screws 32. Thus, by removing the clips the support can be readily detached to facilitate interchange of the end sections and also of the guide itself as guides of different sizes are usually required for different sizes of couplings.

At its center, which of course lies substantially opposite the third leg, which is preferably that containing the piston, the support 30 is provided with a lug 30' extending radially from its outer edge; in plan view, the outer edge of this lug substantially conforms to the pitch circle of the threads which are to be sized as best shown in Fig. 2 in which the pitch circle PC is indicated in broken lines, while in transverse section, the edge of the lug conforms to but is slightly smaller than a transverse section of the thread groove as best shown in Fig. 4; thus, as will be noted from said figure, the lug 30' lies slightly out of engagement with the thread walls and does not bottom in the groove when the gauge is operatively positioned in the coupling for the purpose of sizing it, the edge of the lug being substantially coincident with the pitch circle of the thread, whereas the balls 6 on the ends of the legs and pin 12 project beyond the pitch circle or pitch line as best shown in Fig. 3.

Reference will now be made to the manner of using the gauge in sizing a coupling or other internally threaded article: The indicating gauge G is first adjusted, either with the aid of a standard coupling or of a test ring having a thread of standard size formed therein by locating the balls 6 on the legs 1 and 2 in the first full thread groove thereof, then aligning the ball 6 on the pin 12 with the same thread groove on the opposite side of the coupling, and finally operating the valve 20 so as to admit air or other fluid behind the piston to move it outwardly in the cylinder and thus force the ball on the end of pin 12 into the thread groove as far as it will go. During this movement of the piston the conical surface 25 forces the gauge plunger 23 into the stem of the indicating gauge G and thus actuates the hand H until the piston comes to rest. As the three balls 6 are now fully seated in the first thread groove of the standard coupling or test ring and as the position of the gauge hand corresponds therewith, the gauge dial is now rotated with respect to the hand until the zero on the dial is brought into registry therewith, so that in subsequent sizing operations a zero reading of the gauge will indicate that the dimensions of the piece being sized are exactly standard. A locking screw S or other customary device with which indicating gauges of the character of those which I prefer to employ are usually provided, holds the dial in any desired position of rotative adjustment with respect to the body of the gauge so as to prevent the dial from being accidentally turned from its adjusted position. While the dial adjustment is being made, the air is desirably kept on so as to maintain the piston in projected position, but upon completion of the dial adjustment the air is cut off so as to permit the spring 15 to retract the piston sufficiently to clear the ball on the sliding pin from the thread and thus allow removal of the gauge from the coupling or test ring.

The gauge is now in condition for the testing of couplings of the size to which it has been set and may be utilized for this purpose irrespective of the position of the coupling, although it is usually more convenient to have the latter disposed on its side as shown in Fig. 1 or resting in vertical position on the end opposite to that upon which the test is to be made. With the air or other actuating fluid cut off and the pin 12 and its ball point thus retracted, the gauge handle is grasped by the operator, and the legs of the gauge moved into the coupling or other piece to be sized with the axis of the gauge handle lying substantially coincident with the axis of the coupling until the balls are substantially aligned with the first full thread groove in the latter. As soon as this condition is attained, the actuating fluid is admitted to the cylinder so as to move the piston outward and force the ball carried by the sliding pin into the adjacent thread groove, the reaction of the thrust of this ball against the walls thereof serving to move the gauge slightly toward the opposite side of the coupling and thus firmly seat the other balls 6 in their respective portions of the same groove as shown in Fig. 1. As the piston moves outwardly the coaction of its conical surface 25 with the plunger 23 actuates the hand H so as to move it over the dial until the piston comes to rest. Should the hand then indicate zero on the dial, it is indicative that the piece being sized exactly corresponds with the standard or test piece, but if the hand indicates plus or minus from the zero point, it is apparent that the piece is either over or under size by the amount indicated, the dial being usually calibrated in thousandths of an inch; thus, for example, if a plus or minus tolerance of two thousandths of an inch is permitted and the hand reads in excess of that amount in either direction the coupling should be rejected, whereas if the hand indicates an error within the permitted tolerances the coupling should be retained. As soon as the required reading has been taken, the actuating fluid is cut off and the spring operates to retract the pin 12 so as to clear the ball 6 thereon from the thread and permit the gauge to be withdrawn preparatory to testing the other end of the same coupling or the next piece.

Mention has heretofore been made of the provision of the safety guide, the function of which is to prevent the operator from engaging two of the balls 6 in one convolution of the thread and the other ball in a different convolution thereof as might be possible in its absence. However, the beveled edge of the lug 30' is of sufficient circumferential length to make it impossible to place one of the adjacent balls 6 in one of said convolutions and the other adjacent ball in another convolution since such a condition would necessitate the edge of the guide crossing the apices of two adjacent threads instead of lying in a single thread convolution or groove while, on the other hand, the balls on the arms 1 and 2 cannot be placed in one convolution and the ball on the pin aligned with another convolution without bringing the lug 30' into contact with a thread wall and thus preventing the proper seating of the balls in the thread groove of the piece being sized. The provision of the safety guide is therefore desirable in preventing a careless operator from securing incorrect determinations and also facilitates the rapid and proper positioning of the gauge in the pieces being sized.

By removing the support 30 the leg sections 1', 2' can be readily exchanged, together with the pin 12, for others of different length to adapt the use of the gauge with different sizes of couplings or other internally threaded articles so that one gauge may be conveniently utilized for sizing a plurality of articles of different internal diameters. Additionally, since the balls 6 are of standard diameter for a given size and type of thread, leg end sections and a pin having balls or other points appropriate for the particular size and kind of thread to be sized are, of course, employed when and as required, the particular type and size of ball for a given size and form of thread being customarily prescribed by the Bureau of Standards or other generally recognized authority.

It should be noted that determination of the size of the piece being gauged is entirely independent of the fluid pressure required to actuate the piston 11 so long as the same is sufficient to force the piston outwardly against the spring 15 since the reading of the gauge G is determined solely by the position of the piston in its cylinder when ultimately brought to rest through contact of the point of the pin 12 with the walls of the thread and not by the force or speed with which the piston is thrust outwardly in the cylinder. In consequence, variations in the fluid pressure are not inimical to the proper functioning of the instrument.

It will thus be apparent that by means of a gauge constructed in accordance with my invention, accurate sizing of the threads of internally threaded articles such as couplings may be effected very rapidly and accurately and without the expenditure of any marked physical effort by and resulting fatigue of the workman, and further that sizing of consecutive pieces is effected with the same precision irrespective of the physical condition of the workman or the number of hours which he has been employed in the task. Moreover, the expense of providing the hardened steel test plugs in a numerous range of different sizes is entirely avoided, while the time consumed in sizing a given number of articles by means of my improved gauge over that required for sizing a similar number of articles by the method heretofore employed is enormously reduced with resultant saving in production costs.

While I have herein described one form of my invention with considerable particularity, I do not thereby desire or intend to confine myself specifically thereto or to any precise details of construction and arrangement of the various parts as the same are capable of modifications in various particulars without departing from the spirit and scope of the invention as defined by the appended claims while, moreover, although I have referred more particularly to the use of the invention for the sizing of internally threaded couplings it may, as stated, be employed with equal facility for the sizing of other articles if desired.

Having thus described my invention, I claim and desire to protect by Letters Patent of the United States:

1. A device of the class described, comprising three angularly divergent legs radiating from a common center, one of said legs having a cylinder formed therein, a piston slidable in said cylinder and comprising a conical surface, an indicating gauge having a plunger cooperative with said surface whereby the relative position of the piston in the cylinder is indicated on the gauge, means for supplying fluid under pressure to the inner end of the cylinder to force the piston outwardly therein, and means at the extremities of the other legs and of the pin adapted to enter the groove of an internal thread.

2. A device of the class described, comprising three angularly divergent legs radiating from a common center, one of said legs having a cylinder formed therein, a piston slidable in said cylinder and comprising a conical surface, an indicating gauge having a plunger cooperative with said surface whereby the relative position of the piston in the cylinder is indicated on the gauge, means for supplying fluid under pressure to the inner end of the cylinder to force the piston outwardly therein, resilient means operative to normally maintain the piston in retracted position in the cylinder, and means at the extremities of the other legs and of the pin adapted to enter the groove of an internal thread.

3. A device for sizing internal threads, comprising angularly divergent legs, two of said legs being each provided with a point adapted to enter the groove of an internal thread, the other leg being provided with a cylinder, a piston slidable therein, an outwardly projecting pin carried by the piston and also provided with a point, an indicating gauge, means for actuating the gauge to indicate the extend to which the piston is moved outwardly in the cylinder when all of said points are seated in the thread, and means operative to insure said points being introduced into the same thread convolution during the sizing operation.

4. A device for sizing internal threads, comprising angularly divergent legs, two of said legs being each provided with a point adapted to enter the groove of an internal thread, the other leg being provided with a cylinder, a piston slidable therein, an outwardly projecting pin carried by the piston and also provided with a point, an indicating gauge, means for actuating the gauge to indicate the extent to which the piston is moved outwardly in the cylinder when all of said points are seated in the thread, and means comprising a support disposed between the first mentioned legs and having a lug provided with a beveled edge adapted to enter the same thread convolution as the points at the ends of said legs when the latter are seated therein.

5. A device of the class described comprising three symmetrically angularly divergent legs, two of said legs having removable end sections each having a ball point at its extremity, and the third leg comprising a cylinder, a piston disposed in the cylinder, a removable pin extending from the outer end of the piston and provided with a ball point, means for normally retracting the piston in the cylinder, means for supplying fluid to the inner end of the cylinder to force the piston outwardly therein in opposition to said retracting means, an indicating gauge disposed adjacent the piston, and means comprising a conical surface on the piston and a plunger cooperative therewith adapted to actuate the gauge to indicate the extent of the travel of the piston in the cylinder under the influence of said fluid requisite to seat all of said balls in a single convolution of the internal thread which is to be sized.

6. In combination with an internal thread sizing gauge comprising a pair of divergent legs and thread convolution engaging means respectively carried by said legs adjacent the extremities thereof, a support extending between said legs and carried thereby and a beveled lug integral with said support, disposed in arcuate alignment with said engaging means, and adapted to enter the same thread groove as that engaged by said engaging means.

7. In combination with an internal thread sizing gauge comprising means adapted to engage at spaced points a convolution of the thread to be sized, a support secured to said means and arcuate means carried by said support adapted to enter and engage the same convolution through a predetermined arc between said points when said first mentioned means are brought into engagement therewith at said points.

8. In combination with an internal thread sizing gauge comprising a pair of divergent legs having points adapted to engage at spaced points a convolution of the thread to be sized, a support extending between said legs, and means carried by said support adapted by engagement with the thread to insure engagement of said points with a segment of one thread convolution.

9. The combination with an internal thread sizing gauge comprising a plurality of divergent legs having points adapted to engage the thread to be sized, of means carried by said gauge disposed between two adjacent legs adapted to enter the thread groove between them to thereby constrain the points of all of said legs to engage a single thread convolution during the sizing operation.

In witness whereof, I have hereunto set my hand, this 20th day of June, 1929.

GEORGE E. MIRFIELD.